United States Patent
Hallin et al.

(10) Patent No.: US 7,149,515 B2
(45) Date of Patent: Dec. 12, 2006

(54) VOCODER SELECTION METHOD

(75) Inventors: Thomas G. Hallin, Wheaton, IL (US); Keith A. Olds, Melbourne, FL (US); William N. Shores, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 516 days.

(21) Appl. No.: 10/688,629

(22) Filed: Oct. 17, 2003

(65) Prior Publication Data
US 2005/0083910 A1   Apr. 21, 2005

(51) Int. Cl.
*H04Q 7/20* (2006.01)
*H04B 7/00* (2006.01)

(52) U.S. Cl. .................................... 455/432.2; 455/517

(58) Field of Classification Search ............. 455/414.1, 455/414.4, 432.2, 561, 436, 510; 370/252, 370/256, 342, 347, 352, 368, 395.6; 704/221
See application file for complete search history.

(56) References Cited

U.S. PATENT DOCUMENTS

| | | | |
|---|---|---|---|
| 5,682,416 A | * | 10/1997 | Schmidt et al. ............. 455/436 |
| 5,710,971 A | * | 1/1998 | Armbruster et al. ........ 455/12.1 |
| 5,898,696 A | * | 4/1999 | Proctor et al. .............. 370/468 |
| 6,014,375 A | * | 1/2000 | Janky ......................... 370/347 |
| 6,049,537 A | * | 4/2000 | Proctor et al. .............. 370/342 |
| 6,243,590 B1 | * | 6/2001 | Reddy et al. ............... 455/510 |
| 6,944,137 B1 | * | 9/2005 | Pan et al. .................... 370/266 |
| 2001/0004596 A1 | * | 6/2001 | Steijer et al. ............... 455/436 |
| 2002/0071396 A1 | * | 6/2002 | Lee et al. .................... 370/252 |
| 2003/0043814 A1 | * | 3/2003 | Lee ........................ 370/395.6 |

* cited by examiner

*Primary Examiner*—Benny Q. Tieu
(74) *Attorney, Agent, or Firm*—Frank J. Bogacz; Kevin D. Wills

(57) ABSTRACT

Transcoding needs and selection are performed by a central call control function (17, 35). Each transcoder (18, 23, 34, 36) registers with the appropriate call control (17, 35). The call control then determines whether a vocoder is required at all. If vocoding is required, call control (17, 35) selects the appropriate transcoder (18, 34) and inserts the appropriate transcoder into the bearer traffic stream (16).

20 Claims, 1 Drawing Sheet

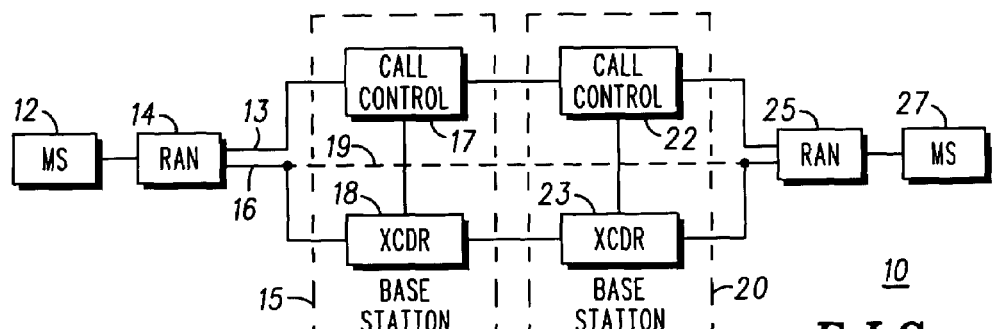
FIG. 1
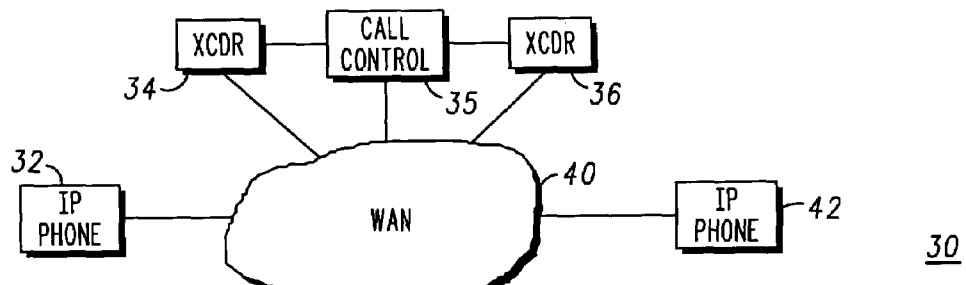
FIG. 2
FIG. 3
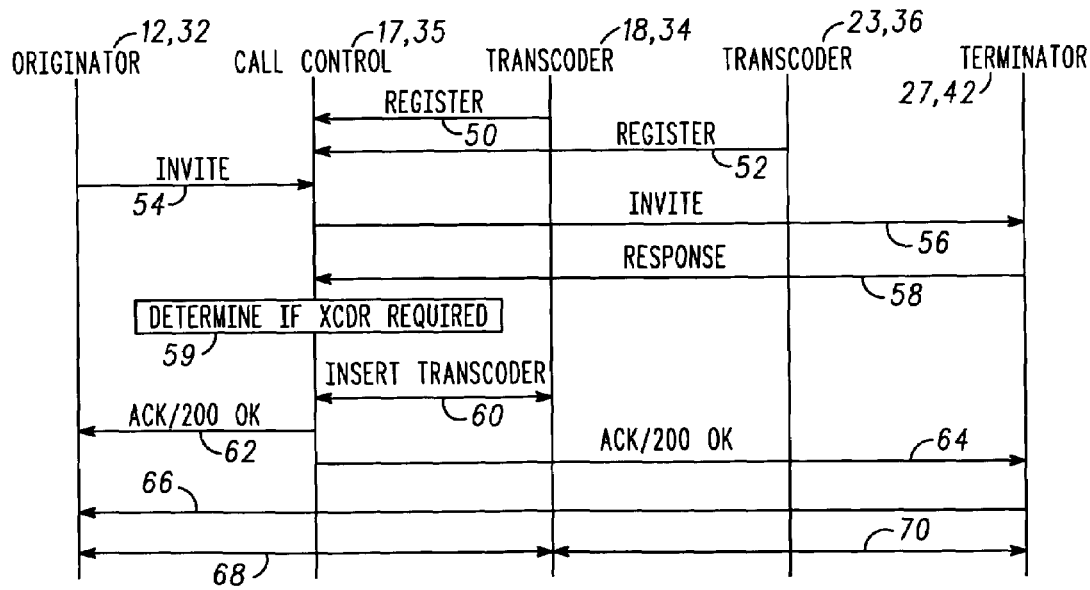

VOCODER SELECTION METHOD

BACKGROUND OF THE INVENTION

The present invention pertains to mobile telecommunications and more particularly to end-to-end vocoder selection.

Mobile stations in a radio access network (RAN) and internet protocol phones in a voice over internet protocol telephony network, require vocoders in order to communicate with other IP phones or mobile stations. These IP phones or mobile stations may have different vocoder requirements.

In most telephony and wireless systems the mismatching vocoder problem is solved in a sub-optimal way by transcoding each end user to a well known vocoder for transmission through the network. Usually G.711 protocol is used for such transmission. The vocoding is set up by the end points negotiating what vocoding capability they support. Such is called transcoding between the mismatching vocoders. This transcoding may even be performed in situations where it would not be required (i.e., if the vocoders matched).

For voice over internet protocol networks which employ session initiation protocol (SIP) one of the IP phones will detect that there is a mismatch between the vocoder capabilities at the two end points. As a result the call may fail because one of the end points does not support a common vocoder arrangement to permit communication. Otherwise, the IP phone or end point may generate a request for a transcoder to be added to the call. This requires several steps through the network. Further adding the transcoder requires that the particular end point or phone know how to access and control the transcoder to be inserted into the call. Such an arrangement requires many steps and network processes. Further a substantial time delay is inserted to the call to provide transcoding services.

Accordingly, it would be highly desirable to have a vocoder selection method which is independent of the end points and provides for transparent communication between the end points without the need of vocoder selection by the end points.

BRIEF DESCRIPTION OF THE DRAWINGS

FIG. 1 is a block diagram of a wireless telephony network in accordance with the present invention.

FIG. 2 is a block diagram of a voice over internet protocol telephony network in accordance with the present invention.

FIG. 3 is a call flow diagram of a vocoder selection method in accordance with the present invention.

PREFERRED EMBODIMENT OF THE INVENTION

Referring to FIG. 1 a block diagram of a radio access network embodying the present invention is shown. Depicted are two mobile stations (MS) 12 and 27 coupled end point to end point via RAN (radio access network) 14, base station 15, base station 20 and RAN 25. Mobile station 12 is serviced over the air by a wireless connection to RAN 14. Typically both bearer and signal path traffic are transmitted through call control 17 by RAN 14 to another base station 22 to reach mobile station 27.

Because mobile stations 12 and 27 may have incompatible vocoders, call control 17 and 22 will control the insertion of transcoders 18 and 23 respectively into the bearer traffic path 16. Signaling information or control information is transmitted via path 13.

Prior to mobile station 12 communicating with mobile station 27, transcoder 18 registers with call control 17. Similarly transcoder 23 registers with call control 22. The registration process includes providing a set of capabilities of the transcoder to the appropriate call control. In this way the call control 17 will know the complete capabilities of each of the transcoders, here shown 18, to which call control 17 may connect.

When mobile station 12 initiates a call to mobile station 27, it will include in the initiating communication a set of vocoders which mobile station 12 supports. This set of vocoders is transmitted via path 13 to call control 17. When call control 17 establishes a signaling path to mobile station 27, mobile station 27 will respond with a set of vocoders which it supports to call control 17. Call control 17 will then determine which vocoding function within transcoder 18 that is compatible with the vocoder set of mobile station 12 and the vocoder set of mobile station 27. Call control 17 will then insert this vocoding function by way of instructing transcoder 18 to insert it in the bearer traffic path 16.

Typically in the prior art, a complex negotiation would have taken place between mobile stations 12 and 27. Further, one of the mobile stations 12 or 27 would have been required to know how to go about connecting in a transcoder in order to provide vocoder to vocoder compatibility.

If call control 17 determines that mobile stations 12 and 27 have directly compatible vocoders, a direct coupling of mobile stations 12 and 27 is performed via path 19 without the insertion of any transcoder. If however mobile station 12 has a particular vocoder V1, for example, and mobile station 27 includes a vocoder V2, a transcoding function is required by call control 17. Call control 17 will then find a transcoder which will translate vocoder 1 to vocoder 2 compatible information and vice-versa. Call control 17 will then configure transcoder 18 to insert this particular transcoding function into the bearer traffic path 16. Next call control 17 will indicate to mobile station 12 that its vocoder V1 is compatible for data transmission. Then call control 17 will indicate to mobile station 27 that its vocoder V2 is compatible for transmission with mobile station 12.

Then communication may take place between mobile stations 12 and 27. Call control 17 determines whether a transcoder is required and thereby the complex negotiation between mobile stations 12 and 27 of vocoding compatibility is avoided. The insertion of the transcoder function by transcoder 18 into the bearer path 16 is transparent to both mobile stations 12 and 27. In this way the call control 17 may optimally select a transcoding function based on the needs and requirements of mobile stations 12 and 27.

Referring now to FIG. 2, a block diagram of a voice over internet protocol network 30 which supports the vocoder selection methodology of the present invention is shown. Internet protocol (IP) phones 32 and 42 are shown connected via wide area network (WAN) 40. Also coupled to wide area network 40 are transcoders (XCDR) 34 and 36. In addition call control 35 is coupled to WAN 40 and to transcoders 34 and 36.

As with the radio access network of FIG. 1, the voice over internet protocol (VOIP) network of FIG. 2 is contacted by both transcoders 34 and 36. Transcoders 34 and 36 register their sets of capabilities with call control 35.

It is assumed that IP phone 32 is the originator of the call and a SIP (session initiation protocol) INVITE message is sent to call control 35 via wide area network 40. Call control 35 transmits the INVITE message to terminator 42 and requests its vocoder capabilities. The INVITE message should not include a SDP offer. Terminator IP phone 42 responds to call control 35 by sending its set of vocoder capabilities.

Call control 35 then determines whether a transcoder is required. If a transcoder is not required, call control 35 acknowledges both the originator 32 and the terminator 42 and the call may take place directly from originator 32 to terminator 42 without the insertion of a transcoder.

If a transcoder is required, call control 35 determines which transcoder will be compatible with originator 32 and terminator 42. Call control 35 then selects this transcoder for insertion to wide area network 40. The traffic path is then from IP phone or originator 32 to wide area network 40 to transcoder 34 or transcoder 36, back to wide area network 40, back to WAN 40 and then to terminating IP phone 42.

Each party originator 32 and terminator 42 only needs to send its capabilities to call control 35. Call control 35 determines whether a transcoder is required. Call control 35 optimally selects a transcoder based on the capabilities of originator 32 and terminator 42. Call control 35 then inserts the chosen transcoder into the speech stream without intervention and transparently to originator 32 and terminator 42.

Referring to FIG. 3, a call flow diagram is shown which explains both the VOIP network of FIG. 2 and the RAN network of FIG. 1. Prior to any calls being placed each of the transcoders 18, 34 register 50 with call control 17 or 35. This registration includes transmitting a list of transcoder capabilities. That is, a list is provided indicating which input vocoders may be coupled to which output vocoders. Similarly, other transcoders 23, 36 register 52 with call control 17 or 35, respectively.

In the case of the VOIP network, originator 32 sends an INVITE request 54 to call control 35. In the RAN network a message is sent 54 upon origination by mobile station 12 to call control 17. The INVITE and initiation each include the set of vocoders which the originator 12, 32 has the capability to send and receive. Next call control 17 or 35 sends an INVITE or message to mobile station 27 or terminator 42. This message 56 may optionally include the vocoding capabilities of originator 12 or 32 as well as the set of vocoders which are available for terminator 27 or 42. Terminator 27 or 42 then responds with a message 58 which includes its set of vocoding capabilities. Call control 17 or 35 receives this response from terminator 27 or 42. Call control 17 or 35 then determines whether transcoding is required. If the call control 17, 35 determines that a transcoding function is required 59, call control 17 or 35 will insert 60 the appropriate transcoder 18, 34.

In the case of the VOIP network, call control network will respond 62 with a 200 ok message. In the case of the RAN network call control 17 will respond to originator 12 indicating the particular vocoder chosen. Next in the VOIP network case, call control 35 will send an acknowledge (ACK) 64 message to terminator 42 indicating the particular vocoder chosen. In the RAN example message 64 will indicate the particular vocoder chosen for speech compatibility with originator 12.

If call control 17 or 35 determine that a transcoder was not required, a direct path 66 through the network is established from originator to terminator. If a transcoder 18, 34 has been inserted by call control 17 or 35 respectively, a path from originator 12, 32 to transcoder 18, 34 will be established 68. In addition a path from transcoder 18, 34 will be established 70 to terminator 27 or 42, respectively.

The call control 17, 35 may choose several methods to determine and optimally select the transcoder choice. First, the call control finds all possible transcoder options based on the sets of vocoders supplied by the two end points (mobile stations or IP phones, for example). Then the call control 17, 35 uses one of the following alternative methods to choose the optimal transcoder.

First, the call control may select the transcoder that gives the best voice quality. This choice may be made using an audio quality scoring, e.g. choose the transcoder that will have the highest endpoint to endpoint quality.

Second, the call control may select the optimal transcoder that most closely matches the highest ranked choice of the two endpoints. If the two endpoints 12, 27 provide a rank ordered list of vocoders to the call control, then the call control 17 may give each a number from 1 to n which matches the order. The call control chooses the transcoder that most closely matches the preference of the two endpoints (where the sum of the two ranks is the lowest). For example, if a common transcoder was ranked first on one endpoint's list and tenth on the other endpoint's list (total=11), a transcoder which is ranked second on both lists (total=4) would be chosen over the former.

Third the call control 17 may select a transcoder that minimizes the bandwidth requirements for either one or both of the endpoints. For example, the call control may select the transcoder that requires the lowest bandwidth channel between the endpoints and the transcoder.

This vocoder selection method offers the benefit of selection by the central server or call control unit as opposed to complex negotiation between originator and terminator. Further, the insertion of a transcoder is completely transparent to the originator and terminator and greatly simplifies their processing and eliminates unwanted negotiation delays. In addition, instead of connecting through a common transcoder whether it is needed or not, the call controller may optimally select the best transcoder for the particular capabilities of the originator and terminator.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A vocoder selection method for providing communication compatibility of an originator with a terminator and vice-versa, the vocoder selection method comprising the steps of:
   requesting by the originator through a communication network to a call controller for a connection to the terminator;
   determining by the call controller whether a transcoder is required for the connection between the originator and the terminator; and
   if the transcoder is required, inserting the transcoder by the call controller into a bearer traffic path between the originator and the terminator.

2. The vocoder selection method as claimed in claim 1, wherein there is further included a step of registering by the transcoder with the call controller.

3. The vocoder selection method as claimed in claim 2, wherein the step of registering includes a step of registering by a plurality of transcoders with the call controller.

4. The vocoder selection method as claimed in claim 3, wherein the step of registering further includes a step of transmitting a set of vocoder capabilities from the transcoder to the call controller.

5. The vocoder selection method as claimed in claim 1, wherein there is further included a step of requesting by the call controller to the communication network for connection with the terminator.

6. The vocoder selection method as claimed in claim 1, wherein there is further included a step of acknowledging by the call controller to the originator for the connection with the terminator.

7. The vocoder selection method as claimed in claim 1, wherein there is further included a step of acknowledging by the call controller to the terminator the connection with the originator.

8. The vocoder selection method as claimed in claim 1, wherein if the step of determining by the call controller indicates that the transcoder is not required, there is further included a step of instructing by the call controller the communication network to make the connection directly between the originator and the terminator.

9. The vocoder selection method as claimed in claim 1, wherein the step of requesting by the originator includes a step of transmitting a set of vocoder capabilities of the originator to the call controller.

10. The vocoder selection method as claimed in claim 1, wherein there is further included a step of transmitting a set of vocoder capabilities of the terminator to the call controller.

11. The vocoder selection method as claimed in claim 10, wherein the step of inserting the transcoder by the call controller into the connection includes a step of selecting by the call controller a transcoder for providing communication capability of the originator and the terminator.

12. The vocoder selection method as claimed in claim 11, wherein a step of selecting the transcoder further includes a step of optimally selecting the transcoder on a basis of audio quality.

13. The vocoder selection method as claimed in claim 1, wherein the communication network includes a mobile telecommunication network.

14. The vocoder selection method as claimed in claim 1, wherein the communication network includes a wide area network.

15. The vocoder selection method as claimed in claim 1, wherein:
the originator includes at least one of:
a mobile station; and/or
an internet protocol phone; and
the terminator includes at least one of:
a mobile station; and/or
an internet protocol phone.

16. A vocoder selection method for a communication network for providing communication between an originator and a terminator, the vocoder selection method comprising the steps of:
determining by a call controller a first set of vocoders supported by the originator;
determining by the call controller a second set of vocoders supported by the terminator; and
inserting, by the call controller into a bearer traffic path between the originator and the terminator, a transcoder having at least one vocoder of the first set of vocoders and at least one vocoder of the second set of vocoders.

17. The vocoder selection method as claimed in claim 16, wherein the step of inserting includes a step of optimally selecting the transcoder based upon audio quality of the first and second sets of vocoders.

18. The vocoder selection method as claimed in claim 16, wherein the step of inserting includes a step of optimally selecting the transcoder based upon a minimum bandwidth of the first and second vocoders.

19. The vocoder selection method as claimed in claim 16, wherein the step of inserting includes a step of optimally selecting the transcoder based upon a preferred match of the first and second sets of vocoders.

20. A vocoder selection method for supporting a call through a communication network between an originator and a terminator, the vocoder selection method comprising the steps of:
obtaining a first set of vocoder capabilities of the originator;
obtaining a second set of vocoder capabilities of the terminator;
selecting a transcoder for supporting at least one of the first set of the vocoder capabilities of the originator and for supporting at least one of the second set of the vocoder capabilities of the terminator and
inserting the transcoder into a bearer traffic path between the originator and the terminator.

* * * * *